United States Patent [19]

Westeppe et al.

[11] Patent Number: 5,104,963
[45] Date of Patent: Apr. 14, 1992

[54] TWO-STAGE PROCESS FOR THE PRODUCTION OF POLYCARBONATES BASED ON SPECIAL DIHYDROXYDIPHENYLALKANES

[75] Inventors: Uwe Westeppe, Mettmann; Dieter Freitag; Gerd Fengler, both of Krefeld; Ulrich Grigo, Kempen, all of Fed. Rep. of Germany

[73] Assignee: Bayer Aktiengesellschaft, Leverkusen Bayerwerk, Fed. Rep. of Germany

[21] Appl. No.: 622,058

[22] Filed: Dec. 4, 1990

[30] Foreign Application Priority Data

Dec. 12, 1989 [DE] Fed. Rep. of Germany ....... 3941014

[51] Int. Cl.$^5$ ............................................. C08G 64/06
[52] U.S. Cl. ................................... 528/196; 528/125; 528/171; 528/198; 528/202; 528/204
[58] Field of Search ............... 528/196, 204, 125, 171, 528/202, 198

[56] References Cited

U.S. PATENT DOCUMENTS

| | | | |
|---|---|---|---|
| 4,097,457 | 6/1978 | Megumi et al. | 260/47 X |
| 4,452,968 | 6/1984 | Bolon et al. | 528/271 |
| 4,469,833 | 9/1984 | Mark | 524/161 |
| 5,021,542 | 6/1991 | Serini et al. | 528/196 |

FOREIGN PATENT DOCUMENTS 0338085 10/1989 European Pat. Off.
3832396 2/1990 Fed. Rep. of Germany.

*Primary Examiner*—Harold D. Anderson
*Attorney, Agent, or Firm*—Joseph C. Gil; Richard E. L. Henderson

[57] ABSTRACT

A process for the preparation of a phenol and solvent free polycarbonate resin is disclosed comprising
(i) forming an oligomeric polycarbonate comprising structural units based on a diphenol corresponding to

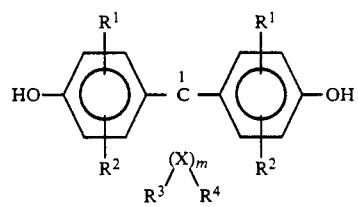

wherein $R^1$ and $R^2$ independently of one another denote a member selected from the group consisting of a hydrogen atom, a halogen atom, $C_{1-8}$ alkyl, $C_{5-6}$ cycloalkyl, $C_{6-10}$ aryl and $C_{7-12}$ aralkyl radicals,
m is an integer of from 4 to 7,
X represents carbon and
$R^3$ and $R^4$ are individually selected for each X and independently of one another represent a hydrogen atom or a $C_{1-6}$ alkyl radical, with the proviso that for at least one X atom, both $R^3$ and $R^4$ are alkyl radicals, and
(ii) condensing said oligomeric polycarbonate at a temperature in the range of of 140 to 350° C.

6 Claims, No Drawings

TWO-STAGE PROCESS FOR THE PRODUCTION OF POLYCARBONATES BASED ON SPECIAL DIHYDROXYDIPHENYLALKANES

This invention relates to a two-stage process for the production of polycarbonates based on special dihydroxydiphenylcycloalkanes corresponding to formula (I)

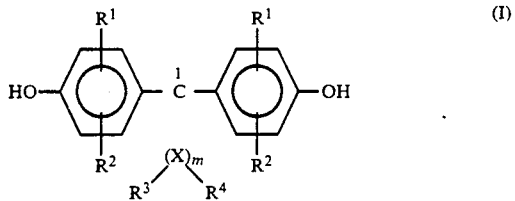

in which
- $R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more especially benzyl,
- m is an integer of from 4 to 7, preferably 4 or 5, $R^3$ and $R^4$ are individually selected for each X and independently of one another represent hydrogen or $C_{1-6}$ alkyl and
- X represents carbon, with the proviso that, at at least one atom X, both $R^3$ and $R^4$ are alkyl.

Preferably at 1 to 2 atoms X and, more particularly, at only 1 atom X, both $R^3$ and $R^4$ are alkyl. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted. More particularly, the invention relates to dihydroxydiphenylcycloalkanes containing 5 and 6 ring C atoms in the cycloaliphatic radical (m=4 or 5 in formula (I)), for example to diphenols corresponding to the following formulae

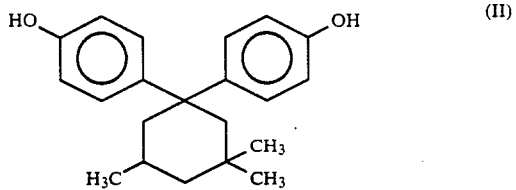

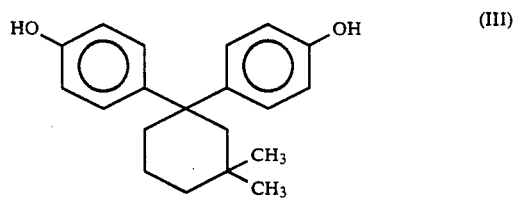

1,1-bis-(4-hydroxyphenyl)-3,3,5-trimethyl cyclohexane (formula II) being particularly preferred.

The dihydroxydiphenylcycloalkanes corresponding to formula (I) and polycarbonates based on the dihydroxydiphenylcycloalkanes are described in German Offenlegungsschrift 38 32 396.

The present invention relates to a two-stage process for the production of polycarbonates based on the dihydroxydiphenylcycloalkanes corresponding to formula (I), wherein oligomeric polycarbonates are prepared in a first stage which are then post-condensed to high molecular weight polycarbonates in a second stage carried out in the melt or by solid-phase post-condensation.

In the process according to the invention, it is possible to use both a single diphenol corresponding to formula (I), in which case homopolycarbonates are formed, and also several diphenols corresponding to formula (I), in which case copolycarbonates are formed.

In addition, the diphenols corresponding to formula (I) may also be used in admixture with other diphenols, for example with those corresponding to the formula HO-Z-OH (IV), for the production of high molecular weight, thermoplastic aromatic polycarbonates. Suitable other diphenols corresponding to the formula HO-Z-OH (IV) are those in which Z is an aromatic radical containing 6 to 30 C atoms which may contain one or more aromatic nuclei, may be substituted and may contain aliphatic radicals or other cycloaliphatic radicals than those corresponding to formula (I) or heteroatoms as bridge members.

Examples of diphenols corresponding to formula (IV) are hydroquinone, resorcinol, dihydroxydiphenyls, bis-hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzenes and ring-alkylated and ring-halogenated compounds thereof.

These and other suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 0956. in FR-PS 1 561 518 and in the book by H. Schnell entitled "Chemistry and Physics of Polycarbonates", Interscience Publishers, New York, 1964, all of which are incorporated by reference herein.

Preferred other diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane,α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl- 4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene,2,2-bis-(3,5-dichloro-4-hydroxyphenyl)-propane and 2,2-bis-(3,5-dibromo-4-hydroxyphenyl)-propane.

Particularly preferred diphenols corresponding to formula (IV) are, for example, 2,2-bis-(4-hydroxyphenyl)-propane, 2,2-bis-(3,5-dimethyl-4-hydroxyphenyl)-propane, and 1,1-bis-(4-hydroxyphenyl)-cyclohexane.

2,2-Bis-(4-hydroxyphenyl)-propane is particularly preferred.

The other diphenols may be used both individually and in admixture with one another.

The molar ratio of diphenols corresponding to formula (I) to the other diphenols optionally used, for example those corresponding to formula (IV), should be between 100 mol-% (I) to 0 mol-% other diphenol and 2 mol-% (I) to 98 mol-% other diphenol, preferably between 100 mol-% (I) to 0 mol-% other diphenol and 15 mol-% (I) to 85 mol-% other diphenol and, more preferably, between 100 mol-% (I) to 0 mol-% other diphenol and 20 mol-% (I) to 80 mol-% other diphenol and, most preferably, between 100 mol-% (I) to 0 mol-% other diphenol and 25 mol-% (I) to 75 mol-% other diphenol. The various diphenols may be attached to one another both statistically and also in blocks.

Small quantities, preferably of from 0.05 to 2.0 mol-% (based on diphenols used), of trifunctional or more than trifunctional compounds, particularly those containing three or more than three phenolic hydroxyl groups, may serve in known manner as branching agents, if used, to obtain branched polycarbonates. Some of the compounds containing three or more than three phenolic hydroxyl groups which may be used as branching agents include phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane,tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalicacidester, tetra-(4-hydroxyphenyl)-methane,tetra-(4-(4-hydroxyphenylisopropyl)-phenoxy)-methane and 1,4-bis-((4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Process stage 1

In the process according to the invention, oligomeric polycarbonates are prepared from diphenols (I) and, optionally, other diphenols in a first stage. The oligomeric polycarbonates preferably have molecular weights $M_w$ of <10,500.

Preferred oligomeric polycarbonates are oligomers corresponding to formula (V)

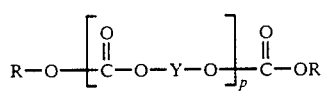

p=integer, preferably <32;

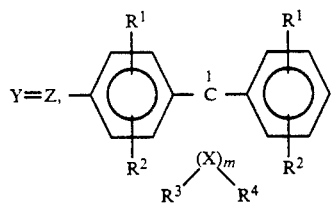

where R=aryl, preferably phenyl, and/or $C_{1-10}$ alkyl, preferably methyl, ethyl. Particularly preferred oligomers are those containing <500 ppm, preferably <350 ppm and more preferably <250 ppm phenolic hydroxyl groups.

The production of the oligomers is not critical and is carried out, for example, by reaction of diphenols corresponding to formula (I) and, optionally, other diphenols with diaryl carbonate and/or di-($C_{1-10}$ alkyl)-carbonates at temperatures in the range from 20° to 350° C. The preferred diaryl carbonate is diphenyl carbonate. Where dialkyl carbonates are used, preferred alkyl radicals are methyl and ethyl. The ratio of diphenols to diaryl carbonates is from 1:0.95 to 1:2.2, preferably from 1:1.1 to 1:1.9 and more preferably from 1:1.2 to 1:1.75. The ratio of bis-phenols to dialkyl carbonates is from 1:1.1 to 1:10 and preferably from 1:1.2 to 1:8. Catalysts may be used to accelerate the reaction. Suitable catalysts are basic organic and/or inorganic compounds, for example alkali (alkaline earth) metal hydroxides, alcoholates, salts, hydrides, pyridine. Organometallic compounds, such as for example triphenylphosphane, triphenylphosphane oxide, organotin compounds, such as dibutyl tin oxide for example, may also be used.

Instead of the diphenols, the corresponding diaryl and/or di-($C_{1-10}$ alkyl)-carboxylic acid esters may also be used.

The oligomeric polycarbonates (V) may also be prepared in known manner by the interfacial process (cf. H. Schnell "Chemistry and Physics of Polycarbonates", Polymer Reviews, Vol. IX, pages 33 et seq, Interscience Publ., 1964). To this end, the diphenols corresponding to formula (I) are dissolved in aqueous alkaline phase. To produce copolycarbonates using other diphenols, mixtures of the diphenols corresponding to formula (I) and the other diphenols, for example those corresponding to formula (IV), are used. Chain terminators are added to regulate molecular weight. These reactants are then reacted with phosgene in the presence of an inert organic phase, which preferably dissolves polycarbonate, by the interfacial condensation method. The reaction temperature is in the range from 0° to 40° C.

Suitable chain terminators are phenols, preferably phenol, and also compounds corresponding to formula (VI)

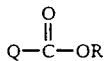

in which

Q=Cl, Br, preferably Cl

R=aryl, preferably phenyl, $C_{1-10}$ alkyl, preferably methyl and ethyl.

The 0.05 to 2 mol-% of branching agents optionally used may either be initially introduced with the diphenols in the aqueous alkaline phase or may be added before phosgenation in solution in the organic solvent.

In addition to the diphenols of formula (I) to be used and the other diphenols (IV), mono- and/or bis-chlorocarbonic acid esters thereof may also be used, being added in solution in organic solvents.

Suitable organic solvents for dissolving the chain terminators and, optionally, for the branching agents and the mono- or bis-chlorocarbonic acid esters are, for example, methylene chloride, chlorobenzene, toluene, acetone, acetonitrile and mixtures of these solvents.

The production of the oligomeric polycarbonates (V) by the interfacial process may be catalyzed in the usual way by such catalysts as tertiary amines, more especially tertiary aliphatic amines, such as tributylamine or triethylamine; the catalysts may be used in quantities of from 0.05 to 10 mol-%, based on mols diphenols used. The catalysts may be added before the beginning of phosgenation or even during or after phosgenation.

The oligomeric polycarbonates (V) are isolated in known manner. Where the oligomers are produced by interfacial polycondensation, they may be isolated, for example, by separating off the organic phase obtained during the interfacial polycondensation, washing it until it is neutral and free from electrolyte and then isolating it as granulate, for example using an evaporation extruder. The oligomers (V) may also be isolated from the solution by precipitation with a non-solvent, such as methanol for example.

Before introduction into the second stage of the process, the oligomers (V) may be further purified by washing with solvent, dissolution and reprecipitation or recrystallization.

Process stage 2

In the process according to the invention, high molecular weight polycarbonates are produced from the oligomeric polycarbonates (V) in a second stage.

To this end, the oligomers (V) are further condensed at temperatures in the range from 140° to 350° C. The condensation reaction may be carried out both in the melt and by solid-phase post-condensation of the oligomers (V). In the latter case, the temperature should be selected so that it is between the temperature $T_1 = T_g - 40°$ C. ($T_g$ = glass temperature) and the melting point $T_m$ of the oligomers (V). The condensation reaction may be carried out in standard reaction vessels, such as tanks, tubes or the like. In one preferred embodiment, the solid-phase condensation is carried out in an inert atmosphere (nitrogen, argon). If the condensation is carried out in the melt, the pressure may be from 0.1 to 2 bar.

The resulting high molecular weight, thermoplastic, aromatic polycarbonates based on diphenols (I) and, optionally, other diphenols are distinguished by advantageous properties. Accordingly, the present invention also relates to high molecular weight, thermoplastic, aromatic polycarbonates based on diphenols (I) produced by a two-stage process, characterized in that oligomers are produced in a first stage and are post-condensed to polymers in a second stage.

The polycarbonates according to the invention may be processed to moldings, for example by injection molding in known manner to various articles, optionally after the introduction of additives.

They are distinguished by good mechanical properties, such as high heat resistance. This means that high temperatures are required for isolating the products, for example using an evaporation extruder. One particular advantage of the process according to the invention is that the products can be produced and isolated at relatively low temperatures. In addition, the products produced by the process according to the invention have a good natural color and are phenol- and solvent-free. The products obtained by the process according to the invention show better resistance to outside influences, such as storage at elevated temperatures, UV irradiation and weathering.

In the following Examples, the relative viscosity is measured on a 0.5% by weight solution of the polycarbonate in $CH_2Cl_2$. The molecular weights are determined by gel permeation chromatography (GPC).

EXAMPLE 1

Production of an oligomer by interfacial reaction 31.0 g (0.1 mol) diphenol (II), 24.0 g (0.6 mol) NaOH and 268 ml water are dissolved with stirring in an inert gas atmosphere. 260 ml methylene chloride are then added. 19.8 g (0.2 mol) phosgene were introduced into the thoroughly stirred solution at pH 13 to 14 and at 21° to 25° C. 5,425 g (0.05 mol) chloroformic acid ethyl ester are added at the same time. 0.4 ml ethyl piperidine are then added, followed by stirring for 45 minutes. The bisphenolate-free aqueous phase is separated off, the organic phase after acidification with phosphoric acid is washed with water until neutral and freed from the solvent.

30.1 g of an oligomeric polycarbonate having a relative solution viscosity of 1.046 are obtained. The molecular weight $M_w$ determined was 3,600.

EXAMPLE 2

62.1 g (0.2 mol) of the diphenol of formula (II) and 48.0 g (1.2 mol) sodium hydroxide are dissolved in 606 ml of water under an inert gas. 606 g of carbon tetra chloride are added. 39.6 (0.4 mol) of phosgene is introduced into the agitated solution at a pH of 13-14 and at a temperature of 21° to 25° C. Subsequently 0.3 ml N-ethylpiperidine are added and agitation is continued for another 45 minutes. The aqueous phase which is free from bisphenol is separated off and the organic phase is acidified with phosphoric acid, washed with water and the organic solvent is removed. The crystalline oligomeric polycarbonate obtained has a relative solution viscosity of 1.09 and melting enthalpy of 16.6 J/g (differential scanning calometry determination).

EXAMPLE 3

Preparation of an oligomer by reaction of bisphenol with diaryl carbonate 31.0 g (0.1 mol) diphenol (II) and 30.6 g (0.143 mol) diphenyl carbonate are heated with stirring to 200° C. in an inert gas atmosphere. After 15 minutes, the mixture is heated to 225° C. and, after another 15 minutes, to 250° C. The melt is left at that temperature for 30 minutes. The volatile constituents are then removed under reduced pressure (<10 mbar). The oligomeric polycarbonate (34 g) had a relative solution viscosity of 1.070. The molecular weight $M_w$ determined was 5,000.

EXAMPLE 4

Post-condensation of the oligomer of Example 1

5 g of the oligomer of Example 1 were heated in an inert gas atmosphere to 160° C. and left at that temperature for 2 h. The resulting polycarbonate had a relative solution viscosity of 1.055.

EXAMPLE 5

Post condensation of the oligomer of Example2

15 g of the oligomer according to Example 2 were heated in a rotational evaporator under nitrogen first for 1 hour to 180° C. and then for another hour to 200° C. Heating was continued for another five hours to 220° C. The resulting polycarbonate had a relative solution viscosity of 1.146.

We claim:

1. A process for the preparation of a phenol- and solvent-free polycarbonate resin comprising
   (i) preparing an oligomeric polycarbonate from a mixture comprising
      (a) 2 to 100 mol-%, based on said mixture, of one or more diphenols corresponding to the formula

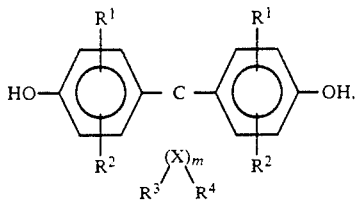

or a di($C_{1-10}$ alkyl) carboxylic acid ester thereof, wherein $R^1$ and $R^2$ independently of one another denote a member selected from the group consisting of hydrogen, halogen, $C_{1-8}$ alkyl, $C_{5-6}$ cycloalkyl, $C_{6-10}$ aryl, and $C_{7-12}$ aralkyl, m is an integer of from 4 to 7, X represents carbon, and $R^3$ and $R^4$ are individually selected for each X and independently represent hydrogen or $C_{1-6}$ alkyl, with the proviso that for at least one X atom, both $R^3$ and $R^4$ are alkyl; and (b) 0 to 98 mol-%, based on said mixture, of one or more diphenols corresponding to the formula

HO—Z—OH or a di($C_{1-10}$ alkyl) carboxylic acid ester thereof, wherein Z is an aromatic radical containing 6 to 30 carbon atoms; and (ii) condensing said oligomeric polycarbonate at a temperature in the range of 140° to 350° C.

2. A process according to claim 1 wherein the oligomeric polycarbonate is prepared by reacting said mixture comprising components (a) and (b) with a diaryl carbonate, a di($C_{1-10}$ alkyl) carbonate, or phosgene.

3. A process according to claim 1 wherein the oligomeric polycarbonate is prepared by reacting, at a temperature of 20° to 350° C., a mixture of one or more diphenols (a) and one or more diphenols (b) with 1.1 to 1.9 parts of a diaryl carbonate for each part of said mixture of diphenols or with 1.1 to 10 parts of a di($C_{1-10}$ alkyl) carbonate for each part of said mixture of diphenols.

4. A process according to claim 1 wherein the oligomeric polycarbonate is prepared by the interfacial condensation method by reacting a mixture comprising one or more diphenols (a) and one or more diphenols (b) in an aqueous alkaline phase with phosgene in the presence of an inert organic phase.

5. The process of claim 1 wherein said oligomeric polycarbonate has a weight average molecular weight of less than 10500.

6. The polycarbonate prepared by the process of claim 1.

* * * * *

UNITED STATES PATENT AND TRADEMARK OFFICE
CERTIFICATE OF CORRECTION

PATENT NO. : 5,104,963
DATED : April 14, 1992
INVENTOR(S) : Uwe Westeppe, Dieter Freitag, Gerd Fengler and Ulrich Grigo It is certified that error appears in the above-identified patent and that said Letters Patent is hereby corrected as shown below:

On the title page, item [57] Abstract, delete the formula and insert the following formula therefor:

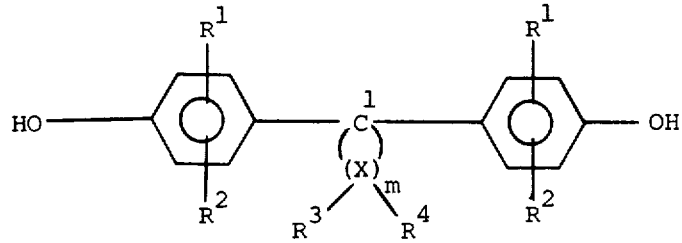

At column 1, at line 15, delete formula (I) and insert the following formula therefor:

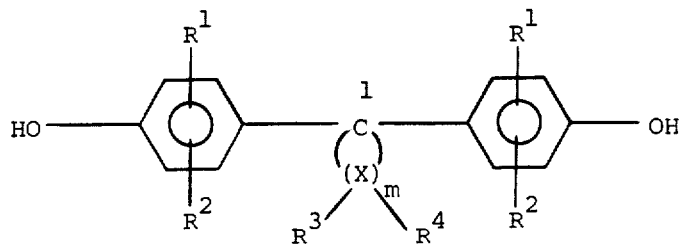

UNITED STATES PATENT AND TRADEMARK OFFICE
CERTIFICATE OF CORRECTION

PATENT NO. : 5,104,963
DATED : April 14, 1992
INVENTOR(S) : Uwe Westeppe, Dieter Freitag, Gerd Fengler and Ulrich Grigo It is certified that error appears in the above-identified patent and that said Letters Patent is hereby corrected as shown below:

At column 3, line 55, delete the formula and insert the following formula therefor:

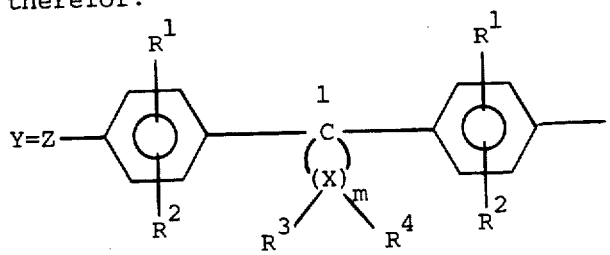

UNITED STATES PATENT AND TRADEMARK OFFICE
CERTIFICATE OF CORRECTION

PATENT NO. : 5,104,963

DATED : April 14, 1992

INVENTOR(S) : Uwe Westeppe, Dieter Freitag, Gerd Fengler and Ulrich Grigo

It is certified that error appears in the above-identified patent and that said Letters Patent is hereby corrected as shown below:

In Claim 1, at column 7, line 5, delete the formula and insert the following formula therefor:

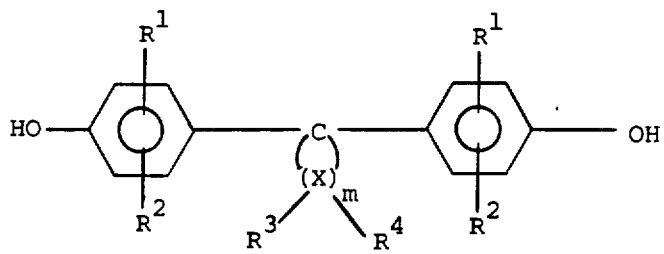

Signed and Sealed this

Ninth Day of November, 1993

*Attest:*

BRUCE LEHMAN

*Attesting Officer*     *Commissioner of Patents and Trademarks*